(12) United States Patent
Rowe

(10) Patent No.: US 7,359,517 B1
(45) Date of Patent: Apr. 15, 2008

(54) NESTABLE SKELETON DECRYPTION KEYS FOR DIGITAL RIGHTS MANAGEMENT

(75) Inventor: Edward R. Rowe, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 921 days.

(21) Appl. No.: 09/973,447

(22) Filed: Oct. 9, 2001

(51) Int. Cl.
*H04L 9/00* (2006.01)
(52) U.S. Cl. ...................... 380/284; 713/170
(58) Field of Classification Search ............... 713/170; 705/51, 61; 380/284
See application file for complete search history.

(56) References Cited

U.S. PATENT DOCUMENTS

| | | | | |
|---|---|---|---|---|
| 6,069,957 | A * | 5/2000 | Richards | 380/281 |
| 6,336,189 | B1 * | 1/2002 | Takeda et al. | 713/200 |
| 6,772,340 | B1 * | 8/2004 | Peinado et al. | 713/168 |

OTHER PUBLICATIONS

Stallings, Williams; Cryptography and Network Security; 2nd edition; 1999; Prentice Hall, Inc.; Chapter 12.*

Stallings, William; Crytography and Network Security; 2nd edition; 1999; Prentice-Hall, Inc.; Chapter 6.*

Stallings, William; Crytography and Network Security, 2nd Edition; Prentice Hall, Inc.; 1995; Chapter 11.*

"PDF Reference: Adobe Portable Document Format version 1.4", Adobe Systems Incorporated., 3rd. ed., section 3.5, pp. 71-81 (copyright 1985-2001).

Jim Pravetz, "PDF Public-Key Digital Signature and Encryption Specification", Acrobat Engineering, Version 3.2, pp. 1-9 (Sep. 12, 2001).

* cited by examiner

*Primary Examiner*—Gilberto Barron
*Assistant Examiner*—Jung Kim
(74) *Attorney, Agent, or Firm*—Fish & Richardson P.C.

(57) ABSTRACT

A document access control scheme uses digital "skeleton keys" to distribute access permissions for encrypted documents in a manner that does not require that rights management files (RMFs) be associated with each document. Multiple skeleton keys can be issued for the same document. The skeleton keys themselves can be opened by one or more other skeleton keys for different levels of document access.

12 Claims, 3 Drawing Sheets

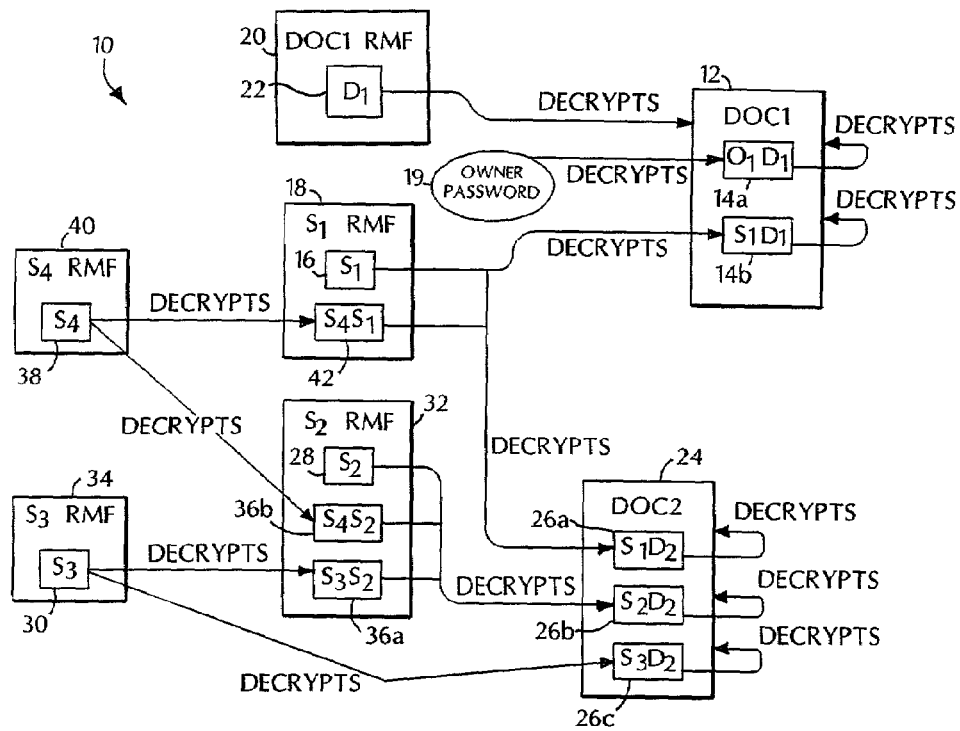
FIG. 1
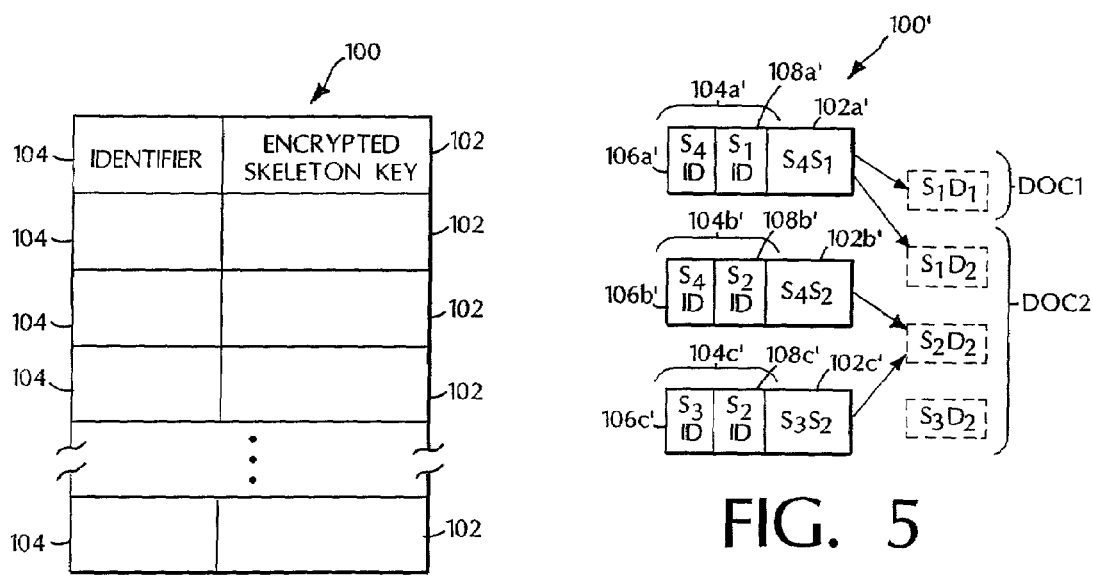
FIG. 4
FIG. 5

NESTABLE SKELETON DECRYPTION KEYS FOR DIGITAL RIGHTS MANAGEMENT

BACKGROUND OF THE INVENTION

The invention relates generally to electronic document management.

In a conventional electronic document management system environment, electronic content that is delivered to requesting users (or subscribers) by a server or system manager is encrypted with an encryption key. To open a document, a user requires an appropriate decryption key. There are a number of different ways of obtaining the decryption key. For example, the decryption key can be synthesized from a rights management file (RMF) or license on the user's system. Because the RMF is specific to the environment to which it was issued, the RMF that is valid to open a document on one user's system does not allow that same document to be opened on a different user's system. It is therefore necessary for a user to have a separate RMF for every document to which that user requires access or purchases. It is further necessary for the user to acquire an RMF or license from the server each time that user attempts to open a document for the first time.

SUMMARY OF THE INVENTION

In one aspect, the invention provides methods and apparatus, including computer program products, for managing access to electronic documents. The methods include associating a first key with an encrypted document decryption key, the encrypted document decryption key being associated with an encrypted document, the encrypted document decryption key when decrypted yielding a document decryption key usable to decrypt the document, the first key being usable to decrypt the encrypted document decryption key, and providing the first key in an access controlled manner to users for use in opening the document.

Particular implementations of the invention may provide one or more of the following advantages. The invention allows a holder of an RMF for a "skeleton key", that is, a key capable of decrypting an encrypted document decryption key or even an encrypted skeleton key, to open any document or set of documents to which the skeleton key applies. The skeleton key RMF holder need not have a copy of the RMF for the document with which the skeleton key is associated. Also, multiple skeleton keys can be issued for the same document, which allows the same document to be a member of more than one set of documents (where a set of documents is defined as the documents that can be opened with a particular skeleton key). Given the ability to open a document with any number of skeleton keys or a skeleton key itself with any number of skeleton keys, any number of access permission flows can be constructed.

Other features and advantages of the invention will be apparent from the following detailed description and from the claims.

BRIEF DESCRIPTION OF THE DRAWINGS

FIG. 1 is an exemplary graphical depiction of decryption-based access permission flows for electronic documents.

FIG. 4 is an illustration of a general format for an encrypted skeleton key "hive" data structure.

FIG. 5 is an illustration of a format for an encrypted skeleton key hive data structure corresponding to the access permission flows example of FIG. 1

DETAILED DESCRIPTION

Figure 2:
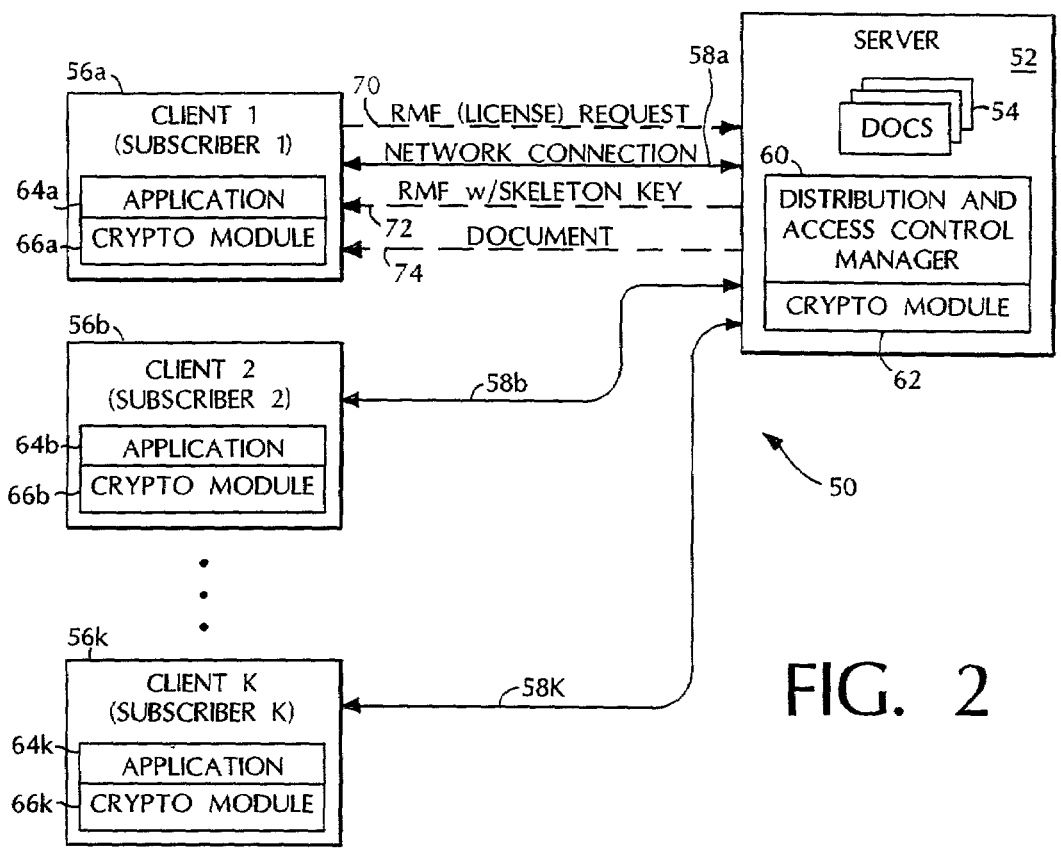
FIG. 2 is a block diagram depicting an exemplary e-document subscription service system environment that employs skeleton keys for controlled electronic document distribution and access.

FIG. 1 shows an exemplary organization 10 of document access permissions. In the example, a first document 12 (DOC1) is an encrypted document capable of being decrypted by a corresponding document decryption key ("D1"). Embedded within the first document 12 are one or more encrypted versions of the document decryption key 14, including encrypted document decryption keys 14*a* and 14*b*. The encrypted document decryption key 14*a* is an owner password-protected version of the first document's document decryption key D1, represented by "O1D1". More specifically, "O1" is an encryption key synthesized from an owner password. The encrypted document decryption key 14*b* is an encrypted version of D1 that is capable of being decrypted by a first "skeleton key" ("S1") 16, represented as "S1D1". The term "skeleton key", as used herein, is defined as a key that is used to decrypt one or more different encrypted document decryption keys or other keys of the same type (that is, encrypted other skeleton keys).

Associated with the skeleton key S1 16 is at least one digital Rights Management File (RMF) 18. The RMF 18 specifies permission rights associated with the use of S1 by a particular holder of the RMF on a given system and includes a copy of S1 (or, alternatively, information that is used to synthesize S1). Thus, in the example shown, a holder (or user) of the S1 RMF 18 is able to use S1 to decrypt S1D1 14*b* and a holder of an owner password 19 is able to synthesize key O1 in order to decrypt O1D1 14*a*. Once decrypted by either O1 or S1, the document DOC1 12 can be decrypted by D1. It is also possible to hold an RMF for the document itself, shown as a DOC1 RMF 20, which contains either a copy of D1 or information used to generate D1 22, and is therefore able to decrypt the document DOC1 12 directly.

Also depicted in the example of FIG. 1 is a second document ("DOC2") 24. The second document 24 is an encrypted document and is capable of being decrypted by a corresponding document decryption key ("D2"). Embedded within the document DOC2 are one or more encrypted versions of the document decryption key 26, including encrypted document decryption keys 26*a*, 26*b* and 26*c*. Like the encrypted document decryption key 14*b*, the encrypted document decryption key 26*a* is capable of being decrypted by the first skeleton key S1 16, and is thus represented as "S1D2". The encrypted document decryption key 26*b* is capable of being decrypted by a second skeleton key S2 28, and is thus represented as "S2D2". Similarly, the encrypted document decryption key 26*c* is an encrypted version of D2 that is capable of being decrypted by a third skeleton key S3 30 ("S3D2").

Associated with the skeleton keys S2 28 and S3 30 are RMFs 32 and 34, respectively. The S2 RMF 32 includes a copy of or information to generate S2 28. Likewise, the S3

RMF 34 includes a copy of or information to generate S3 30. In the configuration shown, the third skeleton key S3 30 can be used by a holder of the RMF 34 to access DOC2 24 with the second skeleton key S2 as well. To enable such access, the S2 RMF 32 is configured to include a first encrypted version of the second skeleton key S2. In this instance, the encrypted S2 is capable of being decrypted by the third skeleton key S3 and therefore represented as "S3S2" 36*a*. The S2 RMF 32 further includes a second encrypted version of the second skeleton key S2 36*b*, the second encrypted version of S2 36*b* capable of being decrypted by a fourth skeleton key S4 38 and therefore represented as "S4S2". Associated with the fourth skeleton key S4 38 is an S4 RMF 40. In the illustrated embodiment, the S4 RMF 40 is configured to include the S4 key 38 or, alternatively, information used to derive or generate the S4 key. Thus, a holder of the RMF 40 is able to use S4 38 to decrypt S4S2 36*b* to obtain the skeleton key S2, which can then be used to decrypt S2D2 26*b* to obtain the document decryption key D2. Once obtained, the document decryption key D2 can be used to decrypt the second document DOC2 24.

The flow of document access rights 10 is designed to enable any holder of an S4 RMF, for example, the S4 RMF 40, to open the first document DOC1 12 as well. By embedding within the S1 RMF 18 an encrypted version of S1 that is capable of being decrypted by S4, that is, "S4S1" 42, the holder of the S4 RMF 40 can access the first document DOC1 12 without having the rights management file for the document itself, i.e., the DOC1 RMF 20. That S4 RMF holder is able to access DOC1 through the S1 RMF 18, that is, use S4 38 to decrypt S4S1 42 to obtain S1 and use S1 to decrypt S1D1. The decrypted S1D1 (or, simply, D1) is used to decrypt the first document 12.

The encryption of the document and skeleton keys can be either symmetric (private key) or asymmetric (public key). Private key encryption uses a common secret key for both encryption and decryption. Types of private key encryption include Data Encryption Standard (DES), Triple-DES, RC4, among others. Public key encryption uses a pair of keys, one public and the other private. Each user has a personal key pair, and the user's public key is used by others to send to the user encrypted messages, which the private key is employed by the user to decrypt. Public key encryption algorithms include the well-known Diffie-Hellman and RSA (Rivest Shamir Adleman) algorithms. In the described embodiment, if a public key encryption scheme is used, a private key is used for encryption and a corresponding public key is used for decryption. Thus, the skeleton key would be a public key. Of course, it will be appreciated that a combination of public and private key encryption schemes could be used. For example, private key encryption could be used for document keys and public key encryption could be used for the skeleton keys.

The documents 12 and 24 can be any type of electronic documents. For example, each document may be formatted in a Portable Document Format (PDF) file. The permission rights or attributes for each user capable of accessing the document may be contained in the PDF file in which the document resides or in a separate file. In addition, permission rights for a particular user are provided to the user in any RMF issued to that user. The permission attributes can indicate varying levels of permissions allowing access to the document, including permission to print, permission to edit and permission to copy. In addition, the permission attributes can grant or deny permission to add another skeleton key to a document file. Thus, a skeleton key RMF holder could be allowed to open a document with a given skeleton key, but not to add the skeleton key to any other document. If public key encryption is used, and permission rights for adding skeleton keys to documents, data structures or files (such as RMF files) are given, then the RMF containing the permission rights must provide not only the public key, i.e., the skeleton decryption key (or information enabling synthesis of the skeleton decryption key), but also the corresponding private key used for the encryption. The permission attributes can also override rights flowing down the decryption path to an RMF (that is, rights specified by an "upstream" RMF) or even rights specified in the document itself. It will be appreciated that there may be other permissions associated with users' permission attributes. Of course, there can be many permutations of permission attributes. For example, the override rights can be made subject to certain constraints.

It will be understood that the decryption paths or access permission flows illustrated in FIG. 1 are intended to provide only one example of the many different levels and types of access that are possible using the skeleton key mechanism. Any number of documents and skeleton keys (and their associated RMFs) may be involved. The permission rights flow design need not include password protection (as shown in FIG. 1). The mechanism requires only that a central access permissions architect or manager controlling document access be able to associate skeleton keys with documents based on access needs of users or an organization, determine permission attributes and issue skeleton key RMFs accordingly. Of course, users could be provided with appropriate permissions to embed skeleton keys (to which they have rights) in documents themselves, thus distributing the architect role among multiple users. Examples of two different system models, which serve to underscore these basic requirements, as well as illustrate the inherent flexibility of the mechanism, are described with reference to FIGS. 2 and 3 below.

FIG. 2 shows an exemplary commercial system environment 50 in which skeleton key document access control is employed. The system includes a document distribution server 52 that makes electronic documents or publications 54 available to one or more clients 56*a*, 56*b*, . . . 56*k*, over network connections 58*a*, 58*b*, 58*k*, respectively, in an access controlled manner. The server 52 can be a World Wide Web (WWW) server and the network connections 58, Internet connections. To support controlled and secure document access, the server 52 includes various software components, including a document distribution and access management software module (or, simply, manager module) 60, which operates in conjunction with and uses a lower-level cryptography ("crypto") module 62.

The manager module 60 includes formatter software that puts digital content in a particular format for distribution. If the documents 54 are to be made available as PDF files, the formatter software is implemented as or has functionality like that of the PDFWriter™ software available from Adobe Systems Incorporated. The manager module 60 performs a number of other tasks. The manager module 60 uses the crypto module 62 to encrypt each document and associates with the encrypted document a document decryption key, which may or may not be the same key as the key used to encrypt the document. The manager module 60 associates skeleton keys with groups of one or more users. The manager module 60 further associates the skeleton keys with document files by encrypting the document decryption keys for the document files with which the skeleton keys are being associated using the crypto module 62. The manager module 60 places the encrypted document decryption keys in the files of the documents with which the skeleton keys are associated. The skeleton keys that are associated with one or more files are capable of decrypting the document decryption keys for those files. The manager module 60 also maintains for a list of users (having access to various documents) associated document access information and permission attributes. The list associates with each user the documents that the user is entitled to access, as well as one or more user system-level descriptors, e.g., hard drive serial numbers.

In addition, the manager module 60 can generate and issue to a particular requestor (user) rights management information in the form of a rights management file for a skeleton key according to the information for that user in the user list.

On the client side, the clients 56a through 56k each are configured with application software 64a through 64k, respectively, including software that enables the client to open and view a document (e.g., in the case of a PDF document, Acrobat Reader™, also available from Adobe Systems Incorporated), and a crypto module 66a through 66k, respectively.

The application software, in conjunction with lower-level protocol layers of a client, for example, the client 56a, desiring access to one of the documents 54, determines if it needs a license (RMF). If the application software determines that it does not already have the appropriate license, it sends a license request to the server 52 (in a communication indicated by arrow 70) over the network connection 58a. Upon receipt of the request, the server 52 prepares an RMF (for a particular skeleton key) specific to the requestor's system hardware and sends the RMF to the requester (in a response communication indicated by arrow 72) over the network connection 58a. At some point, when the user wishes to open the document in the application 64a, the application 64a issues an "open" command. The crypto module 66a detects this event and uses the permission attributes in the RMF to validate the user's system. Once validation has been completed, the application software 64a downloads the requested document from the server 52 (in a data transfer indicated by the arrow 74). The application software uses the crypto module 66a to synthesize the skeleton key from information contained in the RMF or local system fingerprint and uses the skeleton key to decrypt the encrypted document decryption key in the document file and then decrypt the document with the decrypted document decryption key. Once the document is decrypted, the application software 64a is able to open the document for viewing by the user of the client system 56a.

In a typical e-commerce application, such as an on-line subscription service, the clients 1 through client k are subscribers of an on-line publication service, such as a financial market analysis publication. A particular skeleton key, such as the first skeleton key S1 (from FIG. 1), might allow a subscriber having that key to access not only a particular document but a first level of documentation, where "level" may be defined by the type of document and, in addition, a period of access. Thus, returning to the financial analyst reports example, a first skeleton key could be defined to enable a subscriber to access a month's worth of reports. A new skeleton key would be issued each month. If the subscriber is a premier customer, perhaps that subscriber would receive a skeleton key once removed (e.g., the S4 key in the illustration of FIG. 1), entitling that subscriber to access not only reports for the current month, but also reports for the past year.

As noted earlier, the server 52 embeds in the license file the permission attributes for the user. The client application software uses those permission attributes to determine permission rights of the user relative to a given document. Although rights management information has been described thus far in terms of rights management or license files, it will be appreciated that such rights management information need not necessarily reside in such files on the user's system. It could, for example, be downloaded from the server 52 by the user's system.

Figure 3:
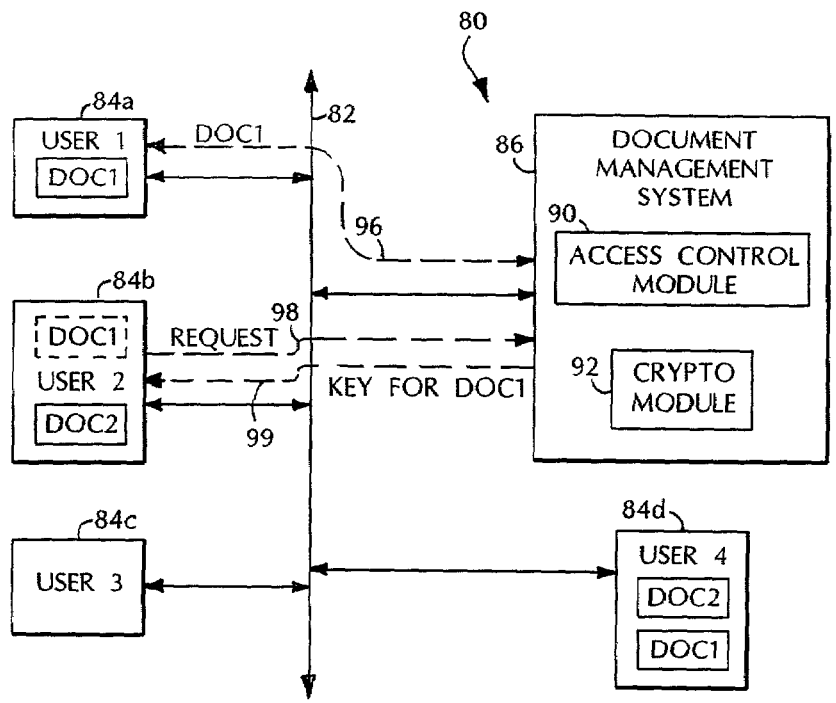
FIG. 3 is a block diagram depicting an exemplary corporate (enterprise) organization system environment that employs skeleton keys for controlled electronic document access.

Other embodiments are contemplated, such as an enterprise (corporate) organization environment 80, as shown in FIG. 3. Connected to a local area network 82 are user systems, that is, general-purpose computers such as personal computers, workstations or the like 84, including systems 84a, 84b, 84c and 84d. Although only four user systems are shown, any number of such systems could be connected to the network 82. The network 82 could be configured to support other types of devices, such as PDAs (personal digital assistants) and mobile phones, for example. Also connected to the network 82 is a document management system 86.

The enterprise organization model of FIG. 3 can be readily distinguished from the commercial subscription service model of FIG. 2 in that, in the enterprise organization model, document generation and, possibly, document distribution are separate from document access. Thus, while the management system 86 performs access control and thus maintains keys and permission rights in a manner similar to that of the server 52 (FIG. 2), the system 86 need not necessarily perform the document distribution. At minimum, the system 86 is configured to include an access control module 90 and a crypto module 92. The access control module 90 is responsible for associating skeleton keys with documents, as well as maintaining the skeleton keys and user permission rights. For example, as shown, if user1 84a creates a document (DOC1) 94, it may perform the first level document encryption, or alternatively, pass the document DOC1 94 to the system 86 (in a transfer indicated by arrow 96), which encrypts the document with the crypto module 92 and embeds encrypted document decryption keys for whichever skeleton keys are to be associated with that document to define the nature of access control for that document. The system 86 returns the DOC1 as modified to the user1 84a. User1 84a sends the DOC1 to user2 84b in an e-mail message. The application software of user2 84b, in an attempt to open the document, checks for a license to the user2 84b. If no such license in located on the system of user2, the application software sends an access request to the system 86 (as indicated by arrow 98). The system 86 checks the document access and permission rights for that user and that document, and if user2 is authorized to access the document, the system 86 returns the appropriate skeleton key or document key in an access controlled manner (as indicated by arrow 99), such as providing the skeleton key in rights management information, e.g., an RMF, for that skeleton key and including in the rights management information the appropriate permission rights for user2.

In the embodiment illustrated in FIG. 3, the user systems 84 are clients and the system 86 is a server that automatically manages document access. The system 86 can also serve as a central repository of documents. In an alternative implementation, instead of having a server, the corporate organization could designate one of the user systems 84 as a system manager to control document access manually.

Thus, using skeleton keys allows an organization to provide different levels of document access for users. For example, and referring to FIGS. 1 and 3, the user4 may be a corporate manager who is entitled to see all of the documents generated by subordinates user1 and user2. Thus, allowing documents 1 and 2 to represent all of the documents produced by users 1 and 2, the user4 would receive the skeleton key S4 to enable access to both of those documents.

It may be desirable to allow each user to maintain a skeleton key "hive" structure (or, simply, "hive") 100, shown in FIG. 4. The hive structure enables use of skeleton keys by a user who may not be connected to the system 86 (and thus unable to request RMFs from the system 86). For the user who is connected to the system 86, access to the hive structure 100 saves that user from having to make repeated accesses to the server 86 and thus reduces server load. The hive 100 includes a copy of all of the encrypted skeleton keys 102 and associated encrypted skeleton key identifiers 104. Each identifier 104 identifies, for the encrypted skeleton key 102 with which it is associated, the skeleton key that decrypts that encrypted skeleton key 102 as well as the skeleton key that is encrypted. The hive 100 resides in a file, a copy of which can reside on every computer in the system 80. Optionally, the hive 100 may include an expiration date beyond which each client system 84 needs to check with the server 86 for updates. Each client or user 84 can maintain a copy of the entire hive 100 or, alternatively, a portion thereof. That is, the hive 100 can be partitioned into multiple, smaller hives. Thus, each client or user 84 could maintain as a hive only a portion of the entire hive 100 and that portion could correspond to that portion of the entire hive that the client is likely to use. If the client 84 needs an encrypted skeleton key not contained in the portion of the hive that it currently maintains, it can obtain a copy from the server 86.

FIG. 5 shows a skeleton key hive 100' for the example of FIG. 1. The hive 100' includes three encrypted skeleton keys 102a', 102b', 102c', corresponding to S4S1, S4S2 and S3S2, respectively. The S4S1 has an identifier 104a' with an ID for S4 106a' and ID for S1 108a'. The encrypted skeleton key S4S2 has an identifier 104b' (with IDS 106b' and 108b' for S4 and S2, respectively). The encrypted skeleton key S3S2 has an identifier 104c' that identifies S3 as the decryption key with an ID 106c' and S2 as the key that will be obtained from the decryption with an ID 108c'. Consequently, a user having a copy of the hive 100', documents DOC1 and DOC2 (and, therefore, the embedded encrypted version of the document key D1, i.e., S1D1, and the encrypted versions of the document key D2, i.e., S1D2, S2D2 and S4D2, as shown in dashed lines), as well as the RMF for S4, will be able to access DOC1 through S1 and DOC2 through S2. A second user having fewer privileges might have a copy of the hive 100', documents DOC1 and DOC2, and an RMF for S2 only, and would be able to open DOC2 and not DOC1 because the hive 100' stores only an encrypted version of S1 and that second user does not have an RMF for S1 or S4.

The manner in which the skeleton key hive structure 100 (shown in FIG. 4) is used to open a document, e.g., a PDF file, will now be described. The hive structure 100 includes one or more entries of the following form:

[ID for decryption key that can decrypt the encrypted skeleton key (ID-Sd)]

[ID for skeleton key that is encrypted (ID-Se)]

[encrypted skeleton key (SdSe)]

With reference to FIG. 4, the IDs ID-Sd and ID-Se collectively correspond to the identifier 104, and individually correspond the IDs 106 and 108, respectively. The encrypted skeleton key SdSe corresponds to the encrypted skeleton key 102. The hive structure 100 is indexed by ID-Se. That is, the hive structure 100 contains an index structure separate from the hive entries or, alternatively, the hive entries are ordered such they are implicitly indexed (e.g., they are sorted by ID-Se). The index structure could also be constructed at run-time, and therefore not actually stored in the hive structure 100 at all.

As was illustrated in FIG. 5, there may be multiple entries with the same ID-Se (or ID 108). For hive structures having multiple entries with the same ID-Se, an alternate, and somewhat smaller organization for hive entries is as follows:

[ID for skeleton key that is encrypted (ID-Se)]

[Number of entries in array]

[Array of]
    [ID for key that can decrypt this instance of entry's encrypted skeleton key (ID-Sd)]
    [encrypted skeleton key (SdSe)]

The set of keys owned by a user will be referred to as set "O". The set of keys that can directly open the document will be referred to as set "P1". The keys in P1 can be ascertained by examining the document itself (or an associated file) for identifiers of the keys.

Figure 6:
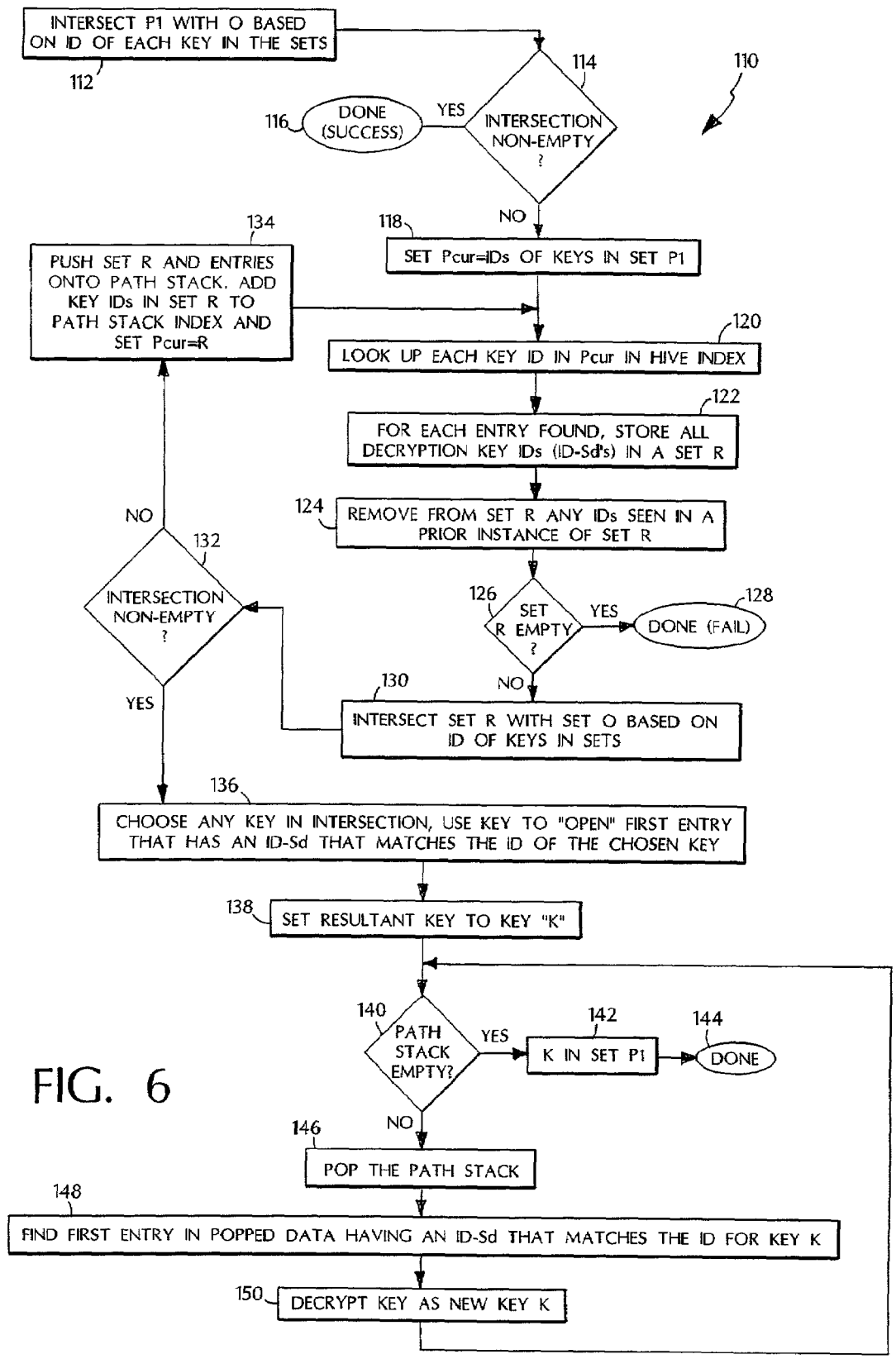
FIG. 6 is an illustration of an exemplary method of using an encrypted skeleton key hive data structure to open a document.

FIG. 6 illustrates a process 110 for opening a document in a document access control environment in which a hive structure is maintained. The process 110 begins by intersecting the set P1 with the set O based on the ID of each key (step 112). Next, the process 110 determines whether or not the intersection is non-empty (step 114). If the intersection of the sets P1 and O is non-empty, the document can be opened directly by a key in the set O, and the process 110 is successful and thus terminates (step 116). Otherwise, the process 110 defines a set (which will be called set "Pcur") to include the IDs of the keys in P1 (step 118). The process 110 looks up each key ID in the set Pcur in the hive's index (step 120), remembering which entries were found, and storing all decryption key IDs (ID-Sd's) for the found entries in another set, which will be called set "R" (step 122). In essence, the steps 120 and 122 collectively look for all hive entries that enable a user who can "open" the entry, that is, decrypt that entry's encrypted skeleton key (SdSe), to get access to a key in the set Pcur.

At this stage in the processing, the set R holds the IDs of keys that can open the entries of interest. The process 110 removes from the set R any IDs that have been seen in a prior instance of the set R (any IDs already in a "path stack" index, as will be described below)(step 124). This removal prevents cycles from causing an infinite loop, and prunes out the starting of new instances of paths through the hive that are already underway. The process 110 determines if the set R is empty (step 126). If the set R is empty, then the process 110 cannot find a path from keys in the set O to keys identified by the IDs in set Pcur. Consequently, there is no path from keys in the set O to the set P1, and the user (owner of the keys in the set O) cannot open the document. The process 110 has failed and terminates (step 128). If it is determined that the set R is not empty, the process 110 intersects set R with set O based on the ID of each key (step 130). The process 110 determines whether or not the intersection of R and O is empty (step 132). If the intersection is empty, then the owner of the keys in the set O cannot directly open any key identified by the set R, but perhaps can "open" one of these keys by getting access to it from another key in the hive structure. Thus, the process 110 pushes R and the list of entries from which it was built onto a "path stack", adds all key IDs in the set R to a "path stack index", sets Pcur=R (step 134) and returns to step 120.

If it is determined that the intersection of sets R and O is non-empty (at step 132), then a key in set O allows the owner of the keys in the set O to open a key identified in the set R. This will allow access to a (possibly empty) chain of keys that will get the user to a key in P1, which will enable the document to be opened. The process 110 starts by choosing any key identified by the intersection of R and O and using that key to "open" (decrypt the key stored within) the first entry associated with the set R, which has an ID-Sd that matches the ID of the chosen key (step 136). The resultant key will be referred to as key "K" (step 138). The process 110 determines if the path stack is empty (step 140). If the path stack is empty, the key K is in set P1 and may now directly be used to open the document (step 142). The process 110 is completed successfully (step 144). If process 110 determines (at step 140) that the path stack is non-empty, the key K can open an entry on the stack, so the process 110 pops the path stack (step 146), and finds the first entry in the popped data whose ID-Sd matches the ID for key K (step 148). The process 110 causes this key to be decrypted, saves the resulting key as key K (at step 150), and returns to step 140.

In an abstract sense, the hive structure is able to model a directed graph with key IDs at the nodes and edges between the nodes indicating "source node can open target node". The algorithm described above can be viewed as a parallel breadth-first search, beginning at all nodes in set P1, and following edges from target to source all at once until a node in set O is encountered, while preventing cycles and redundant paths from being followed. Other approaches are thus possible, for example, a non-parallel breadth-first search, a depth-first search or an exhaustive search could be conducted. The hive could also be modeled differently, with each node structure pointing directly (rather than by ID) to the nodes that can "open" it. The current algorithm has a layer of indirection (the index) to map from nodes to the nodes that can open them. With either approach, however, an index is useful, as the processing must begin by finding the nodes that are in set P1. Without an index, an exhaustive search is required.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Additions, subtractions, and other modifications of the described embodiments will be apparent to those practiced in this field and are within the scope of the following claims.

What is claimed is:

1. A computer-implemented method for managing access to electronic documents, comprising:

associating a first key with an encrypted document decryption key, the encrypted document decryption key being associated with an encrypted document, the encrypted document decryption key when decrypted yielding a document decryption key usable to decrypt the encrypted document, the first key being usable to decrypt the encrypted document decryption key;

encrypting the first key to produce an encrypted first key;

providing the encrypted first key in a first access controlled manner to users for use in opening the encrypted document;

associating with the encrypted first key a second key that can be used to decrypt the encrypted first key; and providing the second key in a second access controlled manner to users for use in opening all documents that can be opened through use of the first key, the second access controlled manner being distinct from the first access controlled manner, wherein providing the second key in an access controlled manner comprises sending information used to synthesize the second key in rights management information, and wherein the rights management information provides a license and defines a set of permission rights associated with the license, and wherein the set of permission rights specifies a right allowing another key to be associated with the rights management information so that a holder of such a key has access to the first key.

2. The method of claim 1, wherein the set of permission rights specifies a right allowing a holder of the first key to add to a second encrypted document a second encrypted document decryption key that can be decrypted by the first key and, when decrypted by the first key, yielding a second document decryption key that is usable to decrypt the encrypted second document.

3. The method of claim 1, wherein multiple keys are usable to decrypt the encrypted document decryption key directly or indirectly, wherein the multiple keys are provided to users in rights management information, and wherein the encrypted document specifies permission rights including a right to override one or more permission rights specified by rights management information for any one or more of the multiple keys.

4. The method of claim 3, wherein the rights management information comprises a rights management file.

5. The method of claim 3, wherein the rights management file is specific to a particular user.

6. The method of claim 3, wherein the rights management file is specific to a particular user-operated system.

7. The method of claim 1, wherein multiple keys are usable to decrypt the encrypted document decryption key directly or indirectly, wherein the multiple keys are provided to users in rights management information, and wherein the encrypted document specifies permission rights including a right to override one or more permission rights specified by rights management information for any one or more of the multiple keys.

8. A computer-implemented method for accessing an electronic document, comprising:

obtaining an encrypted electronic document;

obtaining a collection of three or more keys, the keys including keys that are encrypted, the keys and the document having at least two associations defined between certain pairs of them, where at least one association is a pair consisting of a first key and an encrypted second key indicates that the first key can be used to decrypt and thereby make usable the second key, where at least one association is a pair consisting of the encrypted second key and an encrypted third key, the association indicating that the decrypted second key can be used to decrypt and thereby make usable the third key, where each association of a pair consisting of an encrypted document decryption key and the encrypted document indicates that the encrypted document decryption key, when decrypted, can be used to decrypt the encrypted document, and where a user has access to and can use certain ones of the keys in the collection;

using the associations to identify at least one key in the collection that is usable, directly or indirectly, to open the encrypted document, and to which the user has access, wherein the associations are represented as a directed graph, with each node representing a key or the document, with one or more nodes representing keys accessible to the user, and with one or more edges pointing to the document, and wherein using the associations to identify at least one key comprises finding a path in the directed graph to the node representing the document from one of the nodes representing keys accessible to the user.

9. The method of claim 8, further comprising:

following the path and decrypting each of the keys represented by nodes along the path in turn until an encrypted document decryption key for the document is decrypted.

10. The method of claim 9, wherein each encrypted key is identified by two IDs, including a first ID corresponding to the encrypted key and a second ID corresponding to another of the keys capable of decrypting the encrypted key.

11. The method of claim 10, wherein two or more second IDs correspond to the same first ID, and each of the two or more second IDs and the encrypted keys to which they correspond are stored as separate entries in an array of entries, each of the entries being indexed by the same first ID.

12. The method of claim 10, wherein each encrypted key is stored with the corresponding second ID as an entry in an array and each entry is indexed by the corresponding first ID.

* * * * *

UNITED STATES PATENT AND TRADEMARK OFFICE
CERTIFICATE OF CORRECTION

PATENT NO.        : 7,359,517 B1
APPLICATION NO.   : 09/973447
DATED             : April 15, 2008
INVENTOR(S)       : Edward R. Rowe Page 1 of 1

It is certified that error appears in the above-identified patent and that said Letters Patent is hereby corrected as shown below:

Title page item [56] OTHER PUBLICATIONS title page; column 2, line 1:
        delete "Crytography", and replace with --Cryptography-- title page; column 2, line 3:
        delete "Crytography", and replace with --Cryptography--

Signed and Sealed this

Tenth Day of March, 2009

JOHN DOLL
*Acting Director of the United States Patent and Trademark Office*